United States Patent
Verma et al.

(10) Patent No.: US 12,475,109 B1
(45) Date of Patent: Nov. 18, 2025

(54) OBFUSCATING SEARCH QUERIES

(71) Applicant: INTERNATIONAL BUSINESS MACHINES CORPORATION, Armonk, NY (US)

(72) Inventors: Dinesh C. Verma, New Castle, NY (US); Pawan Raghunath Chowdhary, San Jose, CA (US); David James Beymer, San Jose, CA (US); Swanand Ravindra Kadhe, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/794,550

(22) Filed: Aug. 5, 2024

(51) Int. Cl.
*G06F 16/242* (2019.01)
*G06F 16/2457* (2019.01)
*G06F 16/28* (2019.01)

(52) U.S. Cl.
CPC ...... *G06F 16/242* (2019.01); *G06F 16/24578* (2019.01); *G06F 16/285* (2019.01)

(58) Field of Classification Search
CPC . G06F 16/242; G06F 16/24578; G06F 16/285
See application file for complete search history.

(56) References Cited

U.S. PATENT DOCUMENTS

| | | |
|---|---|---|
| 9,154,506 B1 | 10/2015 | Bhattacharya et al. |
| 9,721,023 B2 | 8/2017 | Clark et al. |
| 10,601,784 B2 | 3/2020 | Feller et al. |
| 11,568,078 B2 | 1/2023 | Vandanapu |
| 2011/0238829 A1* | 9/2011 | Brunell ............... H04L 63/0414 709/224 |
| 2025/0110957 A1* | 4/2025 | Baldua ................ G06F 16/2425 |

OTHER PUBLICATIONS

Ahmad et al., "Intent-aware query obfuscation for privacy protection in personalized web search." In The 41st international ACM SIGIR conference on research & development in information retrieval, pp. 285-294. 2018.

Balsa et al.,"OB-PWS: Obfuscation-based private web search." In 2012 IEEE Symposium on Security and Privacy, pp. 491-505. IEEE, 2012.

(Continued)

*Primary Examiner* — Etienne P Leroux
(74) *Attorney, Agent, or Firm* — Seed Intellectual Property Law Group LLP (57) ABSTRACT

Systems, methods, and computer program products for obfuscating search queries are described herein. A method comprises reading an input query; reading a set of known terms organized into hierarchical classes; determining whether the input query is included in the set of known terms; determining one or more classifications for the input query in accordance with its inclusion in the set of known terms; generating a prompt in accordance with the one or more classifications and the input query; providing the prompt to a generative language model as input; receiving, from the generative language model, a plurality of candidate queries in accordance with the prompt; determining a score for the plurality of candidate queries; and generating a plurality of decoy queries based on the plurality of candidate queries and the score.

20 Claims, 4 Drawing Sheets

(56) References Cited

OTHER PUBLICATIONS

Bashir et al., "Private Web Search Using Proxy-Query Based Query Obfuscation Scheme." IEEE Access 11 (2023): 3607-3625.
Bashir et al., "Proxy-terms based query obfuscation technique for private web search." IEEE Access 10 (2022): 17845-17863.
Bollegala et al., "Query Obfuscation Semantic Decomposition." arXiv preprint arXiv:1909.05819 (2019).
Kumar et al., "Privacy Protection in Personalized Web Search using Obfuscation." International Journal 8, No. 4 (2020).
Petit et al., "PEAS: Private, efficient and accurate web search." In 2015 IEEE Trustcom/BigDataSE/ISPA, vol. 1, pp. 571-580. IEEE, 2015.
TrackMeNot, "About" trackmenot.io (Retrieved May 20, 2024).
Wang et al., "Global and personalized query probability for obfuscation-based web search." In 2020 IEEE International Conference on Knowledge Graph (ICKG), pp. 259-266. IEEE, 2020.
Zou, et al. "Generation of Synthetic Datasets Using Machine Learning Models For Zero-Shot Classification," U.S. Appl. No. 19/034,806, Filing Date-Jan. 23, 2025, 73 pages.
Zou, et al. "Query Obfuscation For Secure Searches" U.S. Appl. No. 18/799,375, Filing Date-Aug. 9, 2024, 73 pages.
Zou, et al. "Query Sequence Obfuscation Using Large Language Model Generation of Decoy Topics," U.S. Appl. No. 19/042,142, Filing Date-Jan. 31, 2025, 35 pages.
D.C. Verma etv al., "Using Large Language Models to protect information search in Multidomain Operations", Proceedings vol. 13051, Artificial Intelligence and Machine Learning for Multi-Domain Operations Applications VI, Jun. 7, 2024, 11 pages, doi: https://doi.org/10.1117/12.3012965.
International Searching Authority, "Notification of Transmittal of the International Search Report and the Written Opinion of the International Searching Authority, or Declaration," Patent Cooperation Treaty, Sep. 16, 2025, 12 pages, International Application No. PCT/EP2025/069782.

* cited by examiner

OBFUSCATING SEARCH QUERIES

BACKGROUND

Embodiments of the present disclosure relate to obfuscating search queries, and more specifically, to performing such obfuscation using decoys generated using language models.

SUMMARY

According to embodiments of the present disclosure, methods of, computer program products for, and computer systems for obfuscating search queries are disclosed. A method for obfuscating search queries may include reading an input query from a client computing platform. The method may include reading a set of known terms. The set of known terms may be organized into hierarchical classes. The method may include determining whether the input query is included in the set of known terms. The method may include determining one or more classifications for the input query based on its inclusion in the set of known terms. The method may include generating a prompt in accordance with the one or more classifications and the input query. The method may include providing the prompt to a generative language model as input. The generative language model may be pretrained for text generation. By way of non-limiting example, the language model is a large language model. The method may include receiving from the generative language model a plurality of candidate queries in accordance with the prompt. The method may include determining a score for the plurality of candidate queries. The method may include generating a plurality of decoy queries based on the plurality of candidate queries and the score.

DETAILED DESCRIPTION

Information held by service providers is frequently accessed through search engines. Users of the service providers provide search queries to a search engine to locate desired information. In some cases, the users may not want their search queries to be revealed to the search engines, the service providers, and/or other entities with access to the search engine. For example, users could be employees and/or other members of an enterprise, or another entity. For example, an enterprise or members of an enterprise may not want search queries regarding work in potential areas of strategic importance to be revealed outside the enterprise. The search queries may be concealed by concealing the identity of the user and/or concealing the search query itself. Current methods for concealing the identity of the user don't work on application-level mechanisms (e.g., cookies) and/or the concealed identity results in access to desired information being restricted (e.g., blocked by a pay wall). Methods for concealing the search query itself include using fixed sets of other terms to generate decoy/proxy queries. This results in decoy/proxy queries that are easily identifiable. Accordingly, there is a need for a more robust method of obfuscating search queries such that original search queries are not identifiable amidst decoy queries. Embodiments of the present disclosure are directed to obfuscating search queries. In particular, the search queries are obfuscated using language models in conjunction with sets of known terms. Such an approach results in the generation of decoy queries which are much harder to identify than those generated using current methods.

Figure 1:
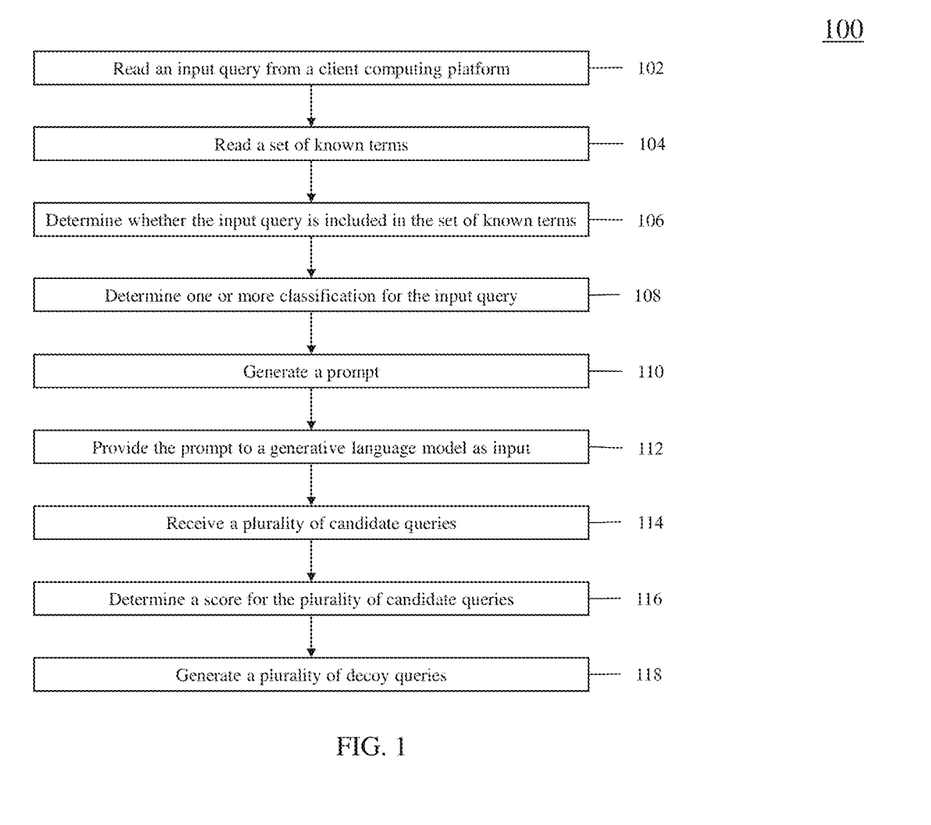
FIG. 1 is a flow diagram depicting an exemplary method for obfuscating search queries, in accordance with one or more embodiments of this disclosure.

FIG. 1 is a flowchart illustrating an exemplary method 100 for obfuscating search queries according to an exemplary embodiment of the present disclosure. The operations of method 100 presented below are intended to be illustrative. In some implementations, method 100 may be accomplished with one or more additional operations not described and/or without one or more of the operations discussed. Additionally, the order in which the operations of method 100 are illustrated in FIG. 1 and described below is not intended to be limiting.

In some implementations, method 100 may be implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 100.

Operation 102 includes reading an input query from a client computing platform. The input query may be a term, a name, a phrase, and/or word(s) regarding which a user is searching for information. In some implementations, one or more input queries from the client computing platform are read. By way of non-limiting example, a plurality of input queries is read at a time. In such an example, operation 102 may include identifying individual ones of the input queries.

Operation 104 includes reading a set of known terms. The set of known terms may be organized into hierarchical classes. In some implementations, the set of known terms may be a directory of the known terms and their class(es). By way of non-limiting example, the set of known terms and the hierarchical classes are generated based on a known ontology class tree (e.g., dbpedia ontology). In some implementations, the known terms are terms having embeddings that can be inverted back to natural text by a language model and/or can be fed into a decoder of a language model to output natural text. In some implementations, the set of known terms and the hierarchical classes are generated based on a manually or automatically generated ontology class tree for a particular entity. The particular entity may be an enterprise, company, group of people, and/or another type of entity. For example, an ontology class tree for a particular entity may be defined for a set of terms and/or classes that are commonly used or understood by members of the particular entity. Operation 106 includes determining whether the input query is included in the set of known terms.

Operation 108 includes determining one or more classifications for the input query based on its inclusion in the set of known terms. In some implementations, determining the one or more classifications includes classifying the input query using named entity recognition. In some implementations, named entity recognition is used upon determining that the input query is not included in the set of known terms. In some implementations, determining the one or more classifications includes providing the input query as input to a classification language model fine-tuned for classification. In such an implementation determining the one or more classifications includes receiving the one or more classifications from the classification language model. In some implementations, the one or more classifications are determined using zero-shot classification. In some implementations, determining the one or more classifications includes classifying the input query based on its inclusion in the set of known terms.

The one or more classifications may have been generated in accordance with the plurality of known terms and the plurality of hierarchical classes. By way of non-limiting example, such generation may be done for input queries included in the set of known terms. By way of non-limiting example, determining the one or more classifications includes classifying the input query based on the organization of the set of known terms. The determination of the one or more classifications may be based on the organization of the set of known terms.

Operation 110 includes generating a prompt in accordance with the one or more classifications and the input query. The prompt may be generated to instruct a generative language model to list terms, names, phrases, and/or words similar to the input query. For example, the prompt may indicate a number of terms, names, phrases, and/or words similar to the input query to be listed or generated by a generative language model. By way of non-limiting example, the prompt may be of the form "List [number] terms similar to [input query]." Operation 112 includes providing the prompt to the generative language model as input. The generative language model may be pretrained for text generation. Operation 114 includes receiving from the generative language model a plurality of candidate queries in accordance with the prompt.

Operation 116 includes determining a score for the plurality of candidate queries. In some implementations, the score may be determined based on a complexity of the plurality of the candidate queries, a quantity of the candidate queries, and/or other characteristics of the candidate queries. In some implementations, the score is based on an average value for such characteristics of the candidate queries. In some implementations, the complexity may indicate a level of difficulty of determining the input query amongst the plurality of candidate queries. By way of non-limiting example, the complexity of the plurality of candidate queries is determined in accordance with a number of unique queries and/or a number of duplicate queries included in the plurality of candidate queries. For example, the plurality of candidate queries including duplicate candidate queries and/or a number of duplicates above a threshold may indicate a low level of complexity of the plurality of candidate queries.

By way of non-limiting example, the complexity of the plurality of candidate queries is determined in accordance with a level of association with the input query and/or other characteristics of the plurality of candidate queries. The level of association may be determined based on a comparison of an embedding for the input query and embeddings for the candidate queries. The plurality of candidate queries may have a low level of association with the input query by virtue of including queries of a different part of speech than the input query, a different classification than the input query, and/or having other differences. For example, the input query is a name identifying a person and the plurality of candidate queries comprises titles of positions that may be held by a person. In such an example, the plurality of candidate queries has a low level of association with the input query. As another example, the input query is a name identifying a person and the plurality of candidate queries comprises names identifying people who have held the same position as the person. In such an example, the plurality of candidate queries has a high level of association. By way of non-limiting example, the score for the plurality of candidate queries may be low by virtue of the plurality of candidate queries having a low level of association. In some implementations, operation 116 includes determining a score for the input query. In such implementations, operation 116 includes comparing the score for the input query to the score for the candidate queries.

Operation 118 includes generating a plurality of decoy queries. The plurality of decoy queries may be generated based on the plurality of candidate queries and/or the score. By way of non-limiting example, generating the plurality of decoy queries includes determining whether the plurality of candidate queries is sufficient for obfuscating the input query. In some implementations, determining the plurality of candidate queries is insufficient for obfuscating the input query includes determining the score is less than or equal to a threshold. In some implementations, determining the plurality of candidate queries is insufficient for obfuscating the input query includes determining the score is greater than or equal to the threshold. In some implementations, determining the plurality of candidate queries is sufficient includes determining a difference between the score for the plurality of candidate queries and the score for the input query is greater than or equal to a threshold difference. In some implementations, determining the plurality of candidate queries is insufficient includes determining the difference is less than or equal to the threshold difference.

In some implementations, generating the plurality of decoy queries includes identifying a subset of the set of known terms that are similar to individual ones of the candidate queries. Identifying the subset of the set of known terms may be responsive to determining the plurality of candidate queries are not sufficient. By way of non-limiting example, the subset may be selected using a sentence similarity search. In some implementations, generating the plurality of decoy queries includes generating a seed prompt. The seed prompt may be generated in accordance with the one or more classifications and the input. In some implementations, generating the plurality of decoy queries includes providing the seed prompt to the generative language model as input. The plurality of decoy queries may be generated by the generative language model. The plurality of decoy queries may be generated in accordance with the seed prompt. In some implementations, the plurality of decoy queries includes the subset of the set of known terms. By way of non-limiting example, the plurality of candidate queries may be used as the plurality of decoy queries responsive to determining the plurality of candidate queries is sufficient.

Figure 3:
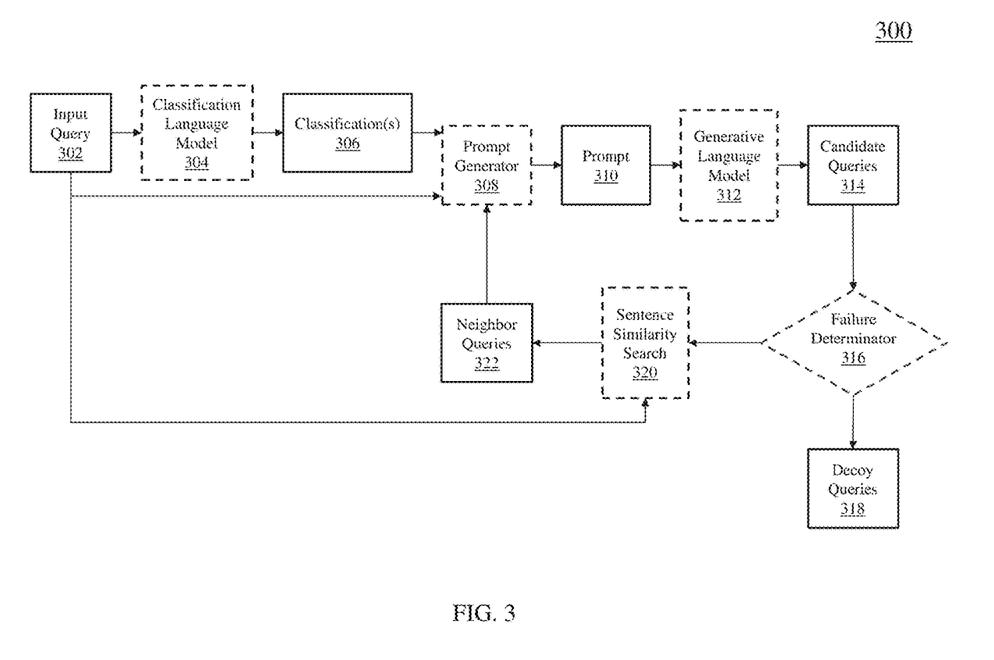
FIG. 3 is a block diagram depicting a process for obfuscating a search query, in accordance with one or more embodiments of the present disclosure.

FIG. 3 is a block diagram illustrating a process 300 for obfuscating a search query according to an exemplary embodiment of the present disclosure. Input query 302 may be read from a client computing platform associated with a user searching for information associated with input query 302. Input query 302 may be read by a local server or a remote server. In such implementations where input query 302 is read by a remote server, reading input query 302 may include receiving input query 302.

Input query 302 is provided as input to classification language model 304. Classification language model 304 may generate one or more classifications 306 for input query 302. Classification(s) 306 and input query 302 may be provided to prompt generator 308. Prompt generator 308 may generate prompt 310 in accordance with classification(s) 306 and input query 302. Prompt 310 may be provided to generative language model 312 as input. Generative language model 312 may generate plurality of candidate queries 314 responsive to receipt of prompt 310 as input. Candidate queries 314 may be provided to failure determinator 316.

Failure determinator 316 may determine whether candidate queries 314 are sufficient for obfuscating input query 302. The determination whether candidate queries 314 are sufficient for obfuscating input query 302 may include determining a score for candidate queries 314 and comparing the score to a threshold. In some implementations, candidate queries 314 are output as decoy queries 318 responsive to failure determinator 316 determining candidate queries 314 are sufficient for obfuscating input query 302. Input query 320 may be provided to a sentence similarity search as input responsive to failure determinator 316 determining candidate queries 314 are insufficient. In some implementations, a set of known terms is also provided to sentence similarity search 320. The set of known terms may be organized into hierarchical classes. By way of non-limiting example, an embedding for input query 302 is compared to embeddings of the known terms. Sentence similarity search 320 may output neighbor queries 322. Neighbor queries 322 may comprise a subset of the known terms that are most similar to input query 302.

Neighbor queries 322 may be provided to prompt generator 308 as input. In some implementations, providing neighbor queries 322 as input to prompt generator 308 may include providing neighbor queries 322 and the classifications for neighbor queries 322 to prompt generator 308. The classifications for the neighbor queries may be determined based on the organization of the known terms. By way of non-limiting example, portions of process 300 may be repeated until failure determinator 316 determines candidate queries 314 are sufficient for obfuscating input query 302.

Figure 2:
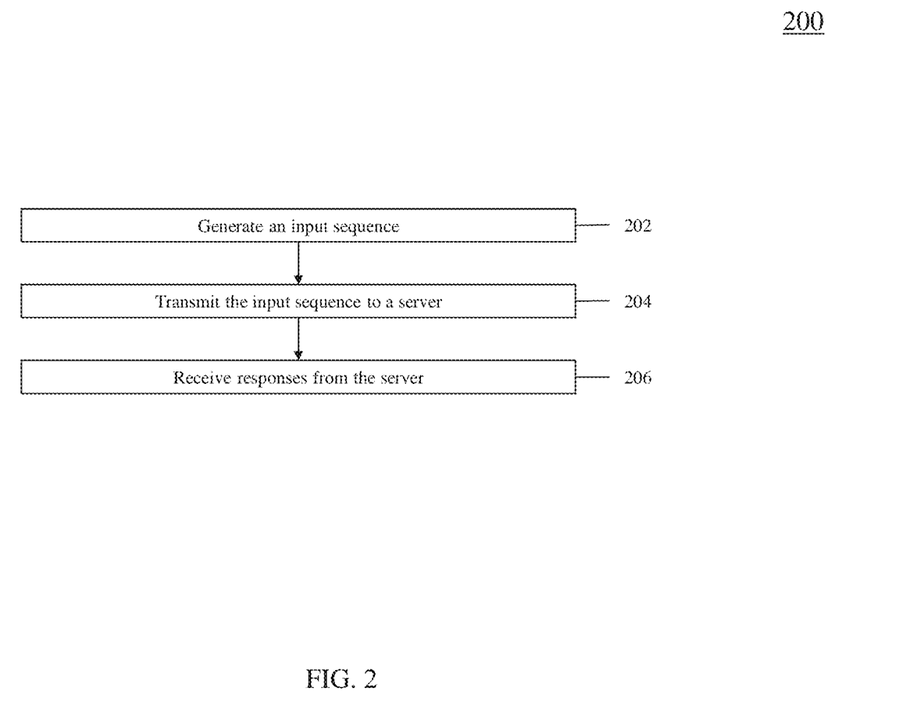
FIG. 2 is a flow diagram depicting an exemplary method for using an obfuscated search query, in accordance with one or more embodiments of this disclosure.

FIG. 2 is a flow diagram illustrating an exemplary method 200 for using an obfuscated search query according to an exemplary embodiment of the present disclosure. The operations of method 200 presented below are intended to be illustrative. In some implementations, method 200 may be accomplished with one or more additional operations not described and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 200.

Operation 202 includes generating an input sequence including the plurality of decoy queries and the input query in a random ordering. Operation 204 includes transmitting the input sequence to a server. The server may be configured to generate a plurality of responses for individual ones of the input sequence. Operation 206 includes receiving the plurality of responses. The plurality of responses may be received from the server. Operation 208 includes selecting at least one response of the plurality of responses generated for the input query. Operation 210 includes transmitting the at least one response to the client computing platform.

Figure 4:
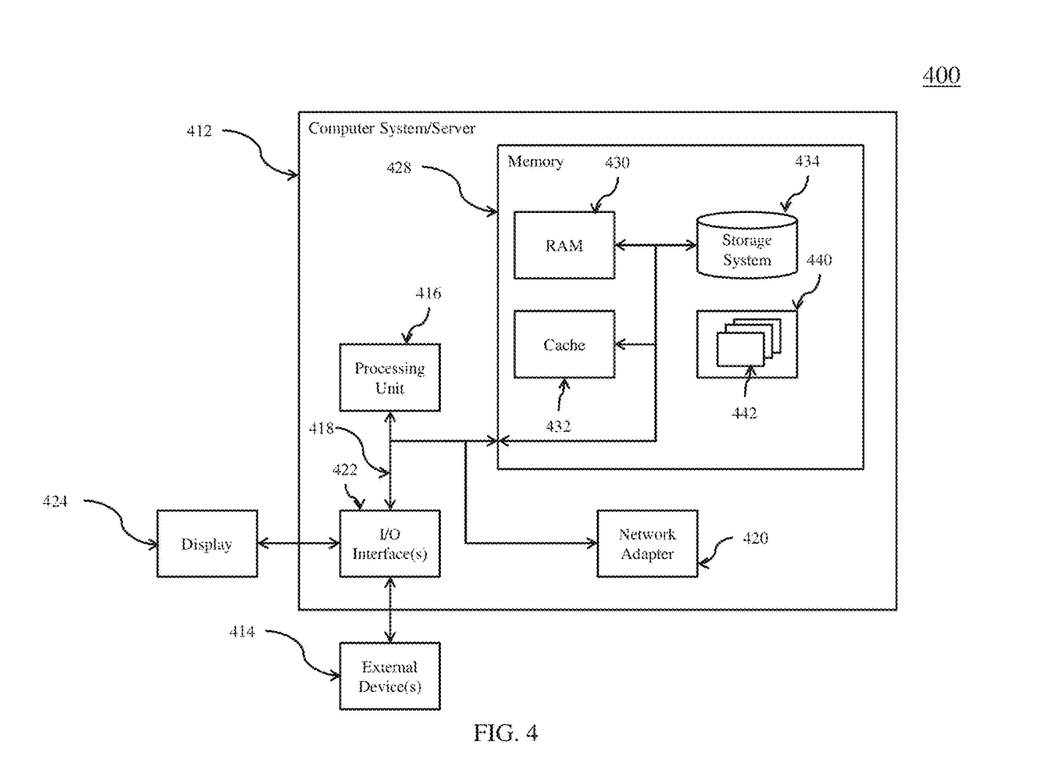
FIG. 4 is a schematic diagram of a computing node, in accordance with one or more embodiments of the present disclosure.

Referring now to FIG. 4, a schematic of an example of a computing node is shown. Computing node 410 is only one example of a suitable computing node and is not intended to suggest any limitation as to the scope of use or functionality of embodiments described herein. Regardless, computing node 410 is capable of being implemented and/or performing any of the functionality set forth hereinabove.

In computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference has been made in detail herein to the exemplary embodiments of the present disclosure, examples of which are illustrated in the accompanying drawings. The systems, devices, and methods disclosed herein are described in detail by way of examples, and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

For any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for obfuscating search queries, the computer-implemented method comprising:
   reading an input query from a client computing platform;
   reading a set of known terms, wherein the set of known terms is organized into hierarchical classes;
   determining whether the input query is included in the set of known terms;
   determining one or more classifications for the input query in accordance with its inclusion in the set of known terms;
   generating a prompt in accordance with the one or more classifications and the input query;
   providing the prompt to a generative language model as input, wherein the generative language model is pre-trained for text generation;
   receiving, from the generative language model, a plurality of candidate queries in accordance with the prompt;
   determining a score for the plurality of candidate queries; and
   generating a plurality of decoy queries based on the plurality of candidate queries and the score.

2. The computer-implemented method of claim 1, wherein determining the one or more classifications includes:
   upon determining that the input query is not included in the set of known terms, classifying the input query using named entity recognition.

3. The computer-implemented method of claim 1, wherein determining the one or more classifications includes:
   providing the input query as input to a classification language model fine-tuned for classification; and
   receiving, from the classification language model, the one or more classifications in accordance with the plurality of known terms and the plurality of hierarchical classes.

4. The computer-implemented method of claim 3, wherein the one or more classifications for the input query are determined using zero-shot classification.

5. The computer-implemented method of claim 1, wherein the score is determined based on a complexity of the plurality of candidate queries and/or a quantity of candidate queries.

6. The computer-implemented method of claim 1, wherein generating the plurality of decoy queries includes:
   determining the score is below a threshold;
   identifying, responsive to determining the score is below the threshold, a subset of the set of known terms that are similar to individual ones of the candidate queries;
   generating a seed prompt in accordance with the one or more classifications and the input query;
   providing the seed prompt to the generative language model as input; and
   generating, by the generative language model, the plurality of decoy queries in accordance with the seed prompt.

7. The computer-implemented method of claim 6, wherein the subset is selected using a sentence similarity search.

8. The computer-implemented method of claim 6, wherein the plurality of decoy queries includes the subset of the set of known terms.

9. The computer-implemented method of claim 1, determining the one or more classifications includes:
classifying the input query based on the organization of the set of known terms.

10. The computer-implemented method of claim 1, further comprising:
generating an input sequence including the plurality of decoy queries and the input query in a random ordering;
transmitting the input sequence to a server, the server configured to generate a plurality of responses for individual ones of the input sequence;
receiving, from the server, the plurality of responses;
selecting at least one response of the plurality of responses generated for the input query; and
transmitting the at least one response to the client computing platform.

11. A computer program product for obfuscating search queries, the computer program product comprising:
a set of one or more computer-readable storage media; and
program instructions, collectively stored in the set of one or more storage media for causing the processor set to perform the following computer operations:
read an input query from a client computing platform;
reading a set of known terms, wherein the set of known terms is organized into hierarchical classes;
determine whether the input query is included in the set of known terms;
determine one or more classifications for the input query in accordance with its inclusion in the set of known terms;
generate a prompt in accordance with the one or more classifications and the input query;
provide the prompt to a generative language model as input, wherein the generative language model is pretrained for text generation;
receive, from the generative language model, a plurality of candidate queries in accordance with the prompt;
determine a score for the plurality of candidate queries; and
generate a plurality of decoy queries based on the plurality of candidate queries and the score.

12. The computer program product of claim 11, wherein determining the one or more classifications includes:
providing the input query as input to a classification language model fine-tuned for classification; and
receiving from the classification language model the one or more classifications in accordance with the plurality of known terms and the plurality of hierarchical classes.

13. The computer program product of claim 11, wherein the score is determined based on a complexity of the plurality of candidate queries and/or a quantity of candidate queries.

14. The computer program product of claim 11, wherein generating the plurality of decoy queries includes:
determining the score is below a threshold;
identifying, responsive to determining the score is below the threshold, a subset of the set of known terms that are similar to individual ones of the candidate queries;
selecting a seed prompt based on the one or more classifications in accordance with the one or more classifications and the input query;
providing the seed prompt to the generative language model as input; and
generating, by the generative language model, the plurality of decoy queries in accordance with the seed prompt.

15. The computer program product of claim 11, wherein the program instructions further cause the processor set to perform the following instructions:
generate an input sequence including the plurality of decoy queries and the input query in a random ordering;
transmit the input sequence to a server, the server configured to generate a plurality of responses for individual ones of the input sequence;
receive, from the server, the plurality of responses;
select at least one response of the plurality of responses generated for the input query; and
transmit the at least one response to the client computing platform.

16. A computer system for obfuscating search queries, the computer program product comprising:
a processor set;
a set of one or more computer-readable storage media; and
program instructions, collectively stored in the set of one or more storage media for causing the processor set to perform the following computer operations:
read an input query from a client computing platform;
reading a set of known terms, wherein the set of known terms is organized into hierarchical classes;
determine whether the input query is included in the set of known terms;
determine one or more classifications for the input query in accordance with its inclusion in the set of known terms;
generate a prompt in accordance with the one or more classifications and the input query;
provide the prompt to a generative language model as input, wherein the generative language model is pretrained for text generation;
receive, from the generative language model, a plurality of candidate queries in accordance with the prompt;
determine a score for the plurality of candidate queries; and
generate a plurality of decoy queries based on the plurality of candidate queries and the score.

17. The computer system of claim 16, wherein determining the one or more classifications includes:
providing the input query as input to a classification language model fine-tuned for classification; and
receiving from the classification language model the one or more classifications in accordance with the plurality of known terms and the plurality of hierarchical classes.

18. The computer system of claim 16, wherein the score is determined based on a complexity of the plurality of candidate queries and/or a quantity of candidate queries.

19. The computer system of claim 16, wherein generating the plurality of decoy queries includes:
- determining the score is below a threshold;
- identifying, responsive to determining the score is below the threshold, a subset of the set of known terms that are similar to individual ones of the candidate queries;
- selecting a seed prompt based on the one or more classifications in accordance with the one or more classifications and the input query;
- providing the seed prompt to the generative language model as input; and
- generating, by the generative language model, the plurality of decoy queries in accordance with the seed prompt.

20. The computer system of claim 16, wherein the program instructions further cause the processor set to perform the following instructions:
- generate an input sequence including the plurality of decoy queries and the input query in a random ordering;
- transmit the input sequence to a server, the server configured to generate a plurality of responses for individual ones of the input sequence;
- receive, from the server, the plurality of responses;
- select at least one response of the plurality of responses generated for the input query; and
- transmit the at least one response to the client computing platform.

* * * * *